July 27, 1965 J. C. SIMON ETAL 3,197,704
PASSIVE RADARS FOR MEASURING THERMAL NOISE USING
PLURAL LOCAL OSCILLATIONS
Filed Nov. 25, 1960 2 Sheets-Sheet 1
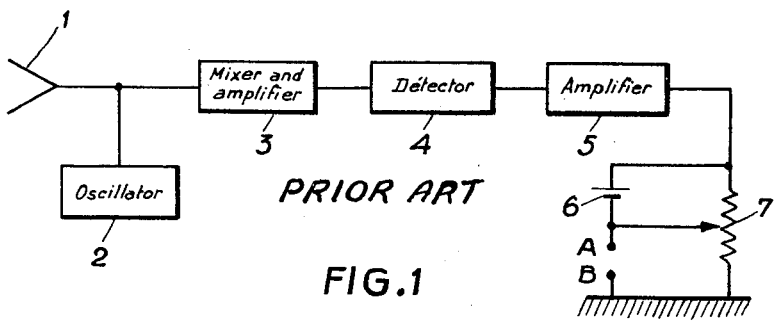
FIG.1 PRIOR ART
FIG.2
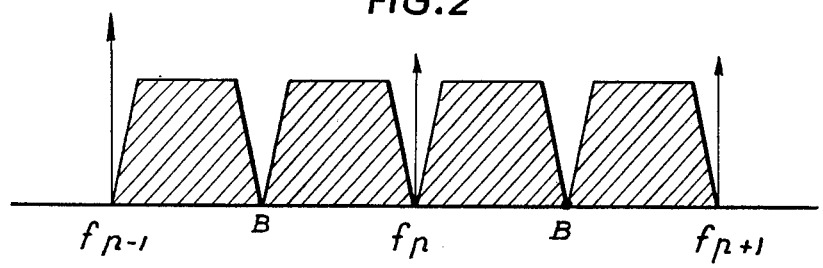
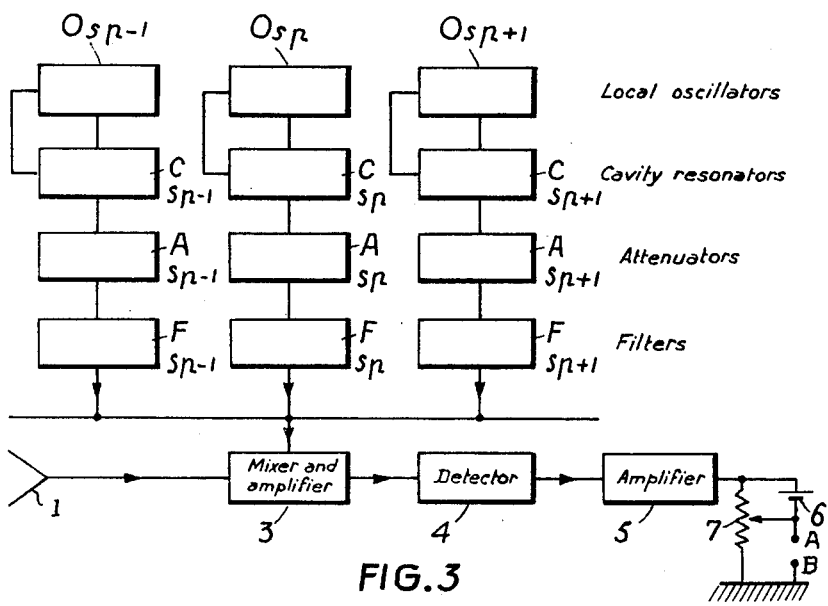
FIG.3

United States Patent Office 3,197,704
Patented July 27, 1965

3,197,704
PASSIVE RADARS FOR MEASURING THERMAL NOISE USING PLURAL LOCAL OSCILLATIONS
Jean Claude Simon and Leon Malnar, both of Paris, France, assignors to Compagnie Generale de Telegraphie Sans Fil, a corporation of France
Filed Nov. 25, 1960, Ser. No. 71,824
Claims priority, application France, Dec. 14, 1959, 812,970
5 Claims. (Cl. 325—438)

The present invention relates to passive detectors.

Passive radars are ultra high frequency receiver devices adapted to measure the characteristic thermal noise generated by various areas of the earth surface, such as those covered with plants, workshops, stretches of water, forests, etc.

Each specific area is characterized by an apparent temperature T. W being the noise energy in a frequency band $\Delta F$ picked up by an ultra high frequency aerial, the apparent temperature is defined by the formula:

$$W = k \cdot T \cdot \Delta F \qquad (1)$$

where $k$ is the Boltzmann's constant.

A receiver having a passband B equal to $\Delta F$ thus makes it possible to may an area by measuring the noise energy W.

Many passive receivers have been designed on this principle. It will be apparent that the information these receivers provide is all the better as the sensitivity of the receiver is greater.

It may be shown that this sensitivity is defined by the following formula:

$$\Delta T = \alpha T_r \sqrt{\frac{b}{\Delta F}} \qquad (2)$$

where:

$\Delta T$ is the lowest detectable noise temperature difference between two adjacent targets or areas;

$T_r$ is the "total temperature of the receiver" given by the relation $$T_r = (F - 1) 300° K \qquad (3)$$

where F is the noise factor of the receiver;

$\alpha$ is a coefficient depending upon the receiver and which is of the order of 5;

$b$ is the video passband of the receiver.

It will be apparent that $\Delta T$ is the lower, as $T_r$ is smaller and $\Delta F$ is greater.

It is an object of the present invention to provide a passive detector the sensitivity of which is improved by decreasing the noise factor F and increasing the passband $\Delta F$.

The passive radar according to the invention comprises an aerial for picking-up the noise energy from ground, means for providing a plurality of local oscillations, the respective frequencies of which $$f_{-n}, f_{-n-1} \ldots \ldots f_{-1}, f_0, f_1 \ldots \ldots f_n$$

are such that they satisfy the relation $$f_{p+1} - f_p = 2B$$

and for mixing them with the received energy, and intermediate frequency amplifier having a passband equal to B and means for measuring the collected noise energy.

The invention will be best understod from the following description and appended drawing, wherein:

FIG. 1 is a block diagram of a conventional passive radar;

FIG. 2 illustrates the principle of a passive radar according to the invention; and FIGS. 3 and 4 show, respectively, two block diagrams of passive detectors according to the invention.

Figure 4:
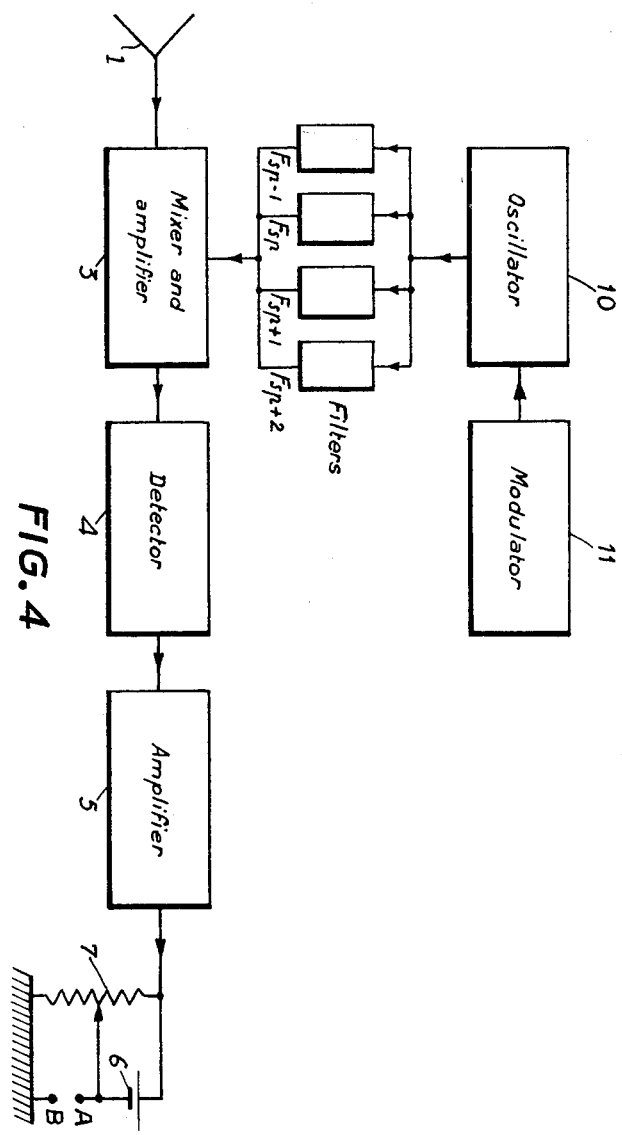

Referring to FIG. 1, there is shown a block diagram of a known passive radar. It comprises an aerial 1, which picks up the noise energy from the inspected ground, and a local oscillator 2 having a fixed frequency $f_0$, which are both coupled to an intermediate frequency mixer and amplifier 3. The latter has a gain $G_B$ and a passband $B = \Delta F$.

Amplifier 3 feeds a detector 4, which may be either quadratic or linear and which, in turn, feeds a low frequency amplifier 5 having a gain $g_b$ and a passband comprised between 0 and $b$ c./s. A potentiometer device connected between amplifier 5 and ground includes a resistance 7 and a D.C. supply 6. It is arranged for cancelling the current at the output of amplifier 5, for a given noise energy collected by aerial 1 and taken as a reference. The noise voltage is then measured across point A and B, i.e. between the output of generator 6 and ground, and is proportional to the variations $\Delta T$ of the apparent ground temperature when passing from one specific area to another.

As mentioned hereinbefore, the sensitivity of such a receiver according to Formula 2 is the higher as the passband band B of amplifier 3 is higher. Formula 3 shows that the sensitvity is an inverse function of the noise factor of the receiver.

According to the invention, instead of having one local frequency $f_0$, as in the device illustrated in FIG. 1, there are provided $2n$ local oscillations $$f_{-n}, f_{-n-1} \ldots \ldots f_0, f_1 \ldots \ldots f_n$$

which are connected to each other by the following relation:

$$f_{p+1} - f_p = 2B$$

These local frequencies are spaced apart as shown in FIG. 2. The intermediate frequency amplifier having a passband extending from 0 to $+B$, or more precisely from a few kilocycles to B c./s., the hatched areas represent the frequency spectrum portions where the noise energy obtained by mixing the noise energy picked up by the aerial and the local oscillations is passed and amplified by amplifier 3. The total passband of the receiver is substantially equal to $2nB = 2n\Delta F$.

A receiver has thus been provided whose passband has been multiplied by $2n$ as compared to the receiver shown in FIG. 1, i.e. whose sensitivity is $\sqrt{2n}$ times higher than that of known receivers, as shown by Equation 2.

On the other hand, the noise factor of the receiver is also decreased, thus further increasing the sensitivity.

FIG. 3 shows schematically an embodiment of a passive receiver according to the invention. This radar includes the same elements as those shown in FIG. 1, i.e. aerial 1, having a bandwidth equal to $2n\Delta F$, amplifier 3 the bandwidth of which extends from 0 to $B = \Delta F$, detector 4, amplifier 5 and potentiometric device 6—7.

The local oscillator of the radar in FIG. 1 is substituted by $2n$ local oscillators, only three of which $O_{sp-1}$, $O_{sp}$, $O_{sp+1}$ are shown. The respective oscillating frequencies of these oscillators are $f_{p-1}, f_p, f_{p+1}$. The oscillator frequencies may be stabilized by means of cavity resonators, such as cavities $C_{sp-1}$, $C_{sp}$, $C_{sp+1}$ and comprise filters, such as filters, $F_{p-1}$, $F_p$, $F_{p+1}$ with passbands equal to 2B and tuned on frequencies $f_{p-1}, f_p, f_{p+1}$, respectively, for eliminating the oscillator noise frequencies lying outside the useful frequency band. Attenuator devices, such as $A_{sp-1}$, $A_{sp}$, $A_{sp+1}$, may be used for equalizing the amplitudes of the local oscillations.

FIG. 4 shows another embodiment of the invention, wherein the $n$ local oscillators have been replaced by a single oscillator which is frequency modulated, as explained hereinafter. This oscillator may be, for example, a "Carcinotron" tube 10 which is frequency modulated by an intermediate frequency modulator 11. The "Carcinotron" tube 10 feeds a plurality of filters, only four of which $F_{sp-1}$, $F_{sp}$, $F_{sp+1}$, $F_{sp+2}$, are shown and which have the same function as those shown in FIG. 2.

The system shown in FIG. 3 operates as follows:

Modulator 11 impresses on the "Carcinotron" tube 10 whose angular frequency is $\Omega$, a frequency modulation $\alpha$, with a modulation index $m$. The output wave is then:

$$u(t) = U \sin [\Omega_0 t + m \sin \alpha t]$$

As is known, the spectrum of such a wave, is a spectrum of rays, with the following frequencies:

$$f_{-n} = \frac{1}{2\pi}(\Omega_0 - n\alpha)$$

...........................

$$f_{-1} = \frac{1}{2\pi}(\Omega_0 - \alpha)$$

$$f_0 = \frac{1}{2\pi}\Omega_0$$

$$f_1 = \frac{1}{2\pi}(\Omega_0 + \alpha)$$

...........................

$$f_n = \frac{1}{2\pi}(\Omega_0 + \alpha n)$$

and the amplitudes, the Bessel functions $$J_n(m) \ldots J_0(m) \ldots J_n(m)$$

For $m = 3.1$ the waves will have the following relative amplitudes,

| | |
|---|---|
| $f_{-3}$ | 33 |
| $f_{-2}$ | 46 |
| $f_{-1}$ | 30 |
| $f_0$ | 28 |
| $f_1$ | 30 |
| $f_2$ | 46 |
| $f_3$ | 33 |

These amplitudes are comparatively near to one another. Consequently, attenuators A are practically no longer necessary, which results in a decrease of the conversion losses of the receiver and, consequently, of the noise factor.

A receiver is thus obtained which has a passband equal to $2nB$ and a highly improved sensitivity for a given noise factor, as indicated by Formula 2. It may also be shown, and it is confirmed by experience that the noise factor of such a receiver decreases rapidly when the number of local oscillations increases.

It may be seen that, for a frequency corresponding to a wavelength of 8 mm. and for a bandwidth B of the intermediate frequency amplifier equal to 100 mc./s., with a single local oscillator $T_r = 8000°$, with $n = 10$, $T_r = 850$.

The increase in sensitivity is of 15 db's, as shown by Formula 2:

$$\sqrt{\frac{1000 \text{ mc./s.}}{100 \text{ mc./s.}}} \cdot 8000/850 \# 30, \text{ i.e. } 12 \text{ } dBs$$

What is claimed is:

1. A passive radar comprising in combination: an aerial having a predetermined bandwidth equal to $2nB$ cycles; mixing and amplifying means having a first input connected to said aerial and a bandwidth extending substantially from 0 to B cycles, said mixing and amplifying means having a second input and an output; means for providing $2n$ local oscillations having frequencies respectively spaced apart by 2B cycles; means for feeding said local oscillations to said second input; and detecting means connected to said output.

2. A passive radar comprising in combination: an aerial having a predetermined bandwidth equal to $2nB$ cycles; mixing and amplifying means having a first input connected to said aerial and a bandwidth extending substantially from 0 to B cycles, said mixing and amplifying means having a second input and an output; $2n$ local oscillators for providing respectively $2n$ local oscillations having frequencies respectively spaced apart by 2B cycles; means for feeding said local oscillations to said second input; and detecting means connected to said output.

3. A passive radar comprising in combination: an aerial having a predetermined bandwidth equal to $2nB$ cycles; mixing and amplifying means having a first input connected to said aerial and a bandwidth extending substantially from 0 to B cycles, said mixing and amplifying means having a second input and an output; $2n$ local oscillators for respectively providing $2n$ local oscillations having frequencies equally spaced apart by 2B cycles; $2n$ cavity resonators and $2n$ filters respectively connected in series between said $2n$ oscillators and said second input; and detecting means connected to said output.

4. A passive radar comprising in combination: an aerial having a predetermined frequency bandwidth equal to $2nB$ cycles, mixing and amplifying means having a first input connected to said aerial and a bandwidth extending substantially from 0 to B cycles, said mixing and amplifying means having a second input and an output; an oscillating tube electronically tunable in said predetermined frequency bandwidth, said tube having an output; a modulator for frequency modulating said oscillating tube; $2n$ bandpass filters respectively tuned to $2n$ frequencies respectively spaced apart by 2B cycles connected between said second input of said mixing and amplifying means and said output of said tube; and detecting means connected to said output of said mixing and amplifying means.

5. A passive radar comprising in combination: an aerial having a predetermined frequency bandwidth equal to $2nB$ cycles; mixing and amplifying means having a first input connected to said aerial, and a bandwidth extending substantially from 0 to B cycles, said mixing and amplifying means having a second input and an output; an oscillator electronically tunable in said predetermined frequency bandwidth, said oscillator having an output; a modulator for cyclically modulating said oscillator with a predetermined angular frequency $\alpha$, and a predetermined modulation index $m$ for generating $2n$ local oscillations having predetermined frequencies equally spaced apart by 2B cycles; $2n$ bandpass filters respectively, tuned to said $2n$ local frequencies, connected in parallel between said second input of said mixing and amplifying means and said output of said tube; and detecting means connected to said output of said mixing and amplifying means.

References Cited by the Examiner

UNITED STATES PATENTS

| | | | |
|---|---|---|---|
| 2,302,852 | 11/42 | Goddard | 325—26 |
| 2,686,294 | 8/54 | Hower | 324—79 |
| 2,952,808 | 9/60 | Hurvitz | 324—79 |
| 2,978,579 | 4/61 | Sosin | 250—20 |

OTHER REFERENCES

Pub. I: Passive Radar Gives Infrared Technique at Microwave Frequencies by Klass, Missile Engineering, Oct. 1, 1957, IR Digest.

FREDERICK M. STRADER, *Primary Examiner.*

KATHLEEN M. CLAFFY, *Examiner.*